United States Patent
Bharti et al.

(10) Patent No.: US 12,452,734 B2
(45) Date of Patent: Oct. 21, 2025

(54) DYNAMIC CHANNEL ALLOCATION

(71) Applicant: International Business Machines Corporation, Armonk, NY (US)

(72) Inventors: Harish Bharti, Pune (IN); Rajesh Kumar Saxena, Maharashtra (IN); Sandeep Sukhija, Rajasthan (IN); Deepak Bajaj, Leicester (GB)

(73) Assignee: International Business Machines Corporation, Armonk, NY (US)

( * ) Notice: Subject to any disclaimer, the term of this patent is extended or adjusted under 35 U.S.C. 154(b) by 736 days.

(21) Appl. No.: 17/651,255

(22) Filed: Feb. 16, 2022

(65) Prior Publication Data

US 2023/0262523 A1    Aug. 17, 2023

(51) Int. Cl.
*H04W 28/08*    (2023.01)
*H04W 28/02*    (2009.01)
*H04W 72/52*    (2023.01)

(52) U.S. Cl.
CPC ... *H04W 28/0967* (2020.05); *H04W 28/0268* (2013.01); *H04W 72/52* (2023.01)

(58) Field of Classification Search
None
See application file for complete search history.

(56) References Cited

U.S. PATENT DOCUMENTS

| 2020/0236118 A1 | 7/2020 | Mayes |
| 2021/0144517 A1 | 5/2021 | Guim Bernat |
| 2022/0132492 A1* | 4/2022 | Schnieders ........... H04W 28/24 |
| 2023/0072769 A1* | 3/2023 | Yeh ................... H04W 28/0858 |

FOREIGN PATENT DOCUMENTS

| CN | 111278132 A | 6/2020 |
| WO | WO2020216135 | * 4/2020 |

OTHER PUBLICATIONS

"TSG Structure", Specifications Groups Home, © 3GPP 2021, 2 pages, <https://www.3gpp.org/specifications-groups/specifications-groups>.
Jiang et al., "Online Channel Assignment, Transmission Scheduling, and Transmission Mode Selection in Multi-Channel Full-Duplex Wireless LANs", Aug. 1, 2015, 10 pages.

* cited by examiner

*Primary Examiner* — Mohammad S Adhami
(74) *Attorney, Agent, or Firm* — Randy Tejeda (57) ABSTRACT

Embodiments of the present invention provide computer-implemented methods, computer program products and computer systems. Embodiments of the present invention can identify an effective channel on a transmission stream framework comprising a plurality of channels and nodes using current capacity states and current transmission schedules. Embodiments of the present invention can then determine whether to continue marshalling on a current channel or to marshal to the effective channel based on transmission demands between nodes and channel providing a minimum latency between available options within the transmission stream framework

17 Claims, 3 Drawing Sheets

DYNAMIC CHANNEL ALLOCATION

BACKGROUND

The present invention relates in general to channel allocation and in particular to dynamic channel allocation for mobile edge computing.

Multi-access edge computing (MEC), refers to an architecture concept that enables cloud computing capabilities and an IT service environment at the edge of a network (e.g., cellular). Specifically, by running applications and performing related processing tasks closer to the cellular customer, network congestion is reduced and applications perform better. MEC technology is designed to be implemented at the cellular base stations or other edge nodes and enables flexible and rapid deployment of new applications and services for customers. MEC also allows cellular operators to open their radio access network (RAN) to authorized third parties, such as application developers and content providers.

MEC provides a distributed computing environment for application and service hosting. It also has the ability to store and process content close to cellular subscribers, for faster response time. Applications can also be exposed to real-time radio access network (RAN) information. The key element is the MEC application server, which is integrated at the RAN element. This server provides computing resources, storage capacity, connectivity and access to RAN information. It supports a multitenancy run-time and hosting environment for applications. The virtual appliance applications are delivered as packaged operating system virtual machine (VM) images or containers incorporating operating systems and applications. The platform also provides a set of middleware application and infrastructure services. Application software can be provided from equipment vendors, service providers and third parties.

In telecommunications, 5G is the fifth-generation technology standard for broadband cellular networks and is the planned successor to the 4G networks which provide connectivity to most current cellphones. 5G networks are cellular networks, in which the service area is divided into small geographical areas called cells. All 5G wireless devices in a cell are connected to the Internet and telephone network by radio waves through a local antenna in the cell. The main advantage of the new networks is that they will have greater bandwidth, giving higher download speeds. In addition to 5G being faster than existing networks, 5G can connect more different devices, and even if people are in crowded areas, the servers will be more unified, improving the quality of Internet services.

SUMMARY

According to an aspect of the present invention, there is provided a computer-implemented method. The computer implemented method comprises: identifying an effective channel on a transmission stream framework comprising a plurality of channels and nodes using current capacity states and current transmission schedules; and determining whether to continue marshalling on a current channel or to marshal to the effective channel based on transmission demands between nodes and channel providing a minimum latency between available options within the transmission stream framework.

BRIEF DESCRIPTION OF THE DRAWINGS

Preferred embodiments of the present invention will now be described, by way of example only, with reference to the following drawings, in which.

DETAILED DESCRIPTION

Embodiments of the present invention recognize the growth of mobile communication services is mainly due to the mobile internet and Internet of Things. The global mobile data traffic in the era of 5G is expected to grow beyond the 4G era. The typical applications and services run on 5G such as autonomous driving, interactive games, Internet of things etc., require higher provisioning and computing capabilities. Mobile edge computing (e.g., vehicle-to-everything (V2X), Ultra-reliable and Low Latency Communication (URLLC), NR-based access to unlicensed spectrum (NR-U), Integrated Access and Backhaul (IAB), Mobile Communication System for Railways: FRMC Phase 2 among the Rel 16 protocol, etc.) enables this federated demand. Mobile edge computing allows the computation tasks to be executed at the nodes while the fluidity of the term node is being referenced being as defined in the 5G release 16 onwards.

As multiple nodes are transmitting over limited number of channels being seen as the open end of the virtualized cluster of 5G core network (e.g., 5GC,) the edge would have to decide which of the streams (interpretation or raw) gains priority during the handshake (e.g., sync, guard, sync etc.). The stream of data typically comprises raw data which is meshed up with interpretation of raw data (e.g., machine learning as a Fabric). Overlay on data transmissions are also modulated within the stream. Embodiments of the present invention recognize that as data needs to be marshalled and transmitted over the available channels, channel transfer rate is not known pre-emptively. As the required rate to transfer the complete stream of meshed data is higher as compared to available channel(s) assigned, complete stream of data is scheduled and transmitted, the channel remains occupied until downlink dissociates on the ACK-reverses (e.g., acknowledgement that the data block is fully transferred, and guard bands are elapsed).

Embodiments of the present invention further recognize that it is difficult to determine the data marshalling scheme because these nodes are designed to have mutual coupling being synchronized by a transmission scheduling. Embodiments of the present invention provide solutions for this problem that considers both data marshalling and transmission scheduling, not led as differentiated subroutines but being realistically allowed to interpolate (as described in 5GC). Embodiments of the present invention evaluate whether the stability of the system is at risk. In response to determining that there is a risk, embodiments of the present invention consider marshalled data as valid and both the interpreted and raw data can be coupled and sent with each other's interference. Embodiments of the present invention leverages this framework to evaluate choices and make an informed decision. For example, embodiments of the present invention identify the channel transmission and marshalling based on Lyapunov optimization technique. In this manner, as described in greater detail, embodiments of the present invention optimize the usage of available transmission resources (e.g., scheduled or guarded within 5GC).

Figure 1:
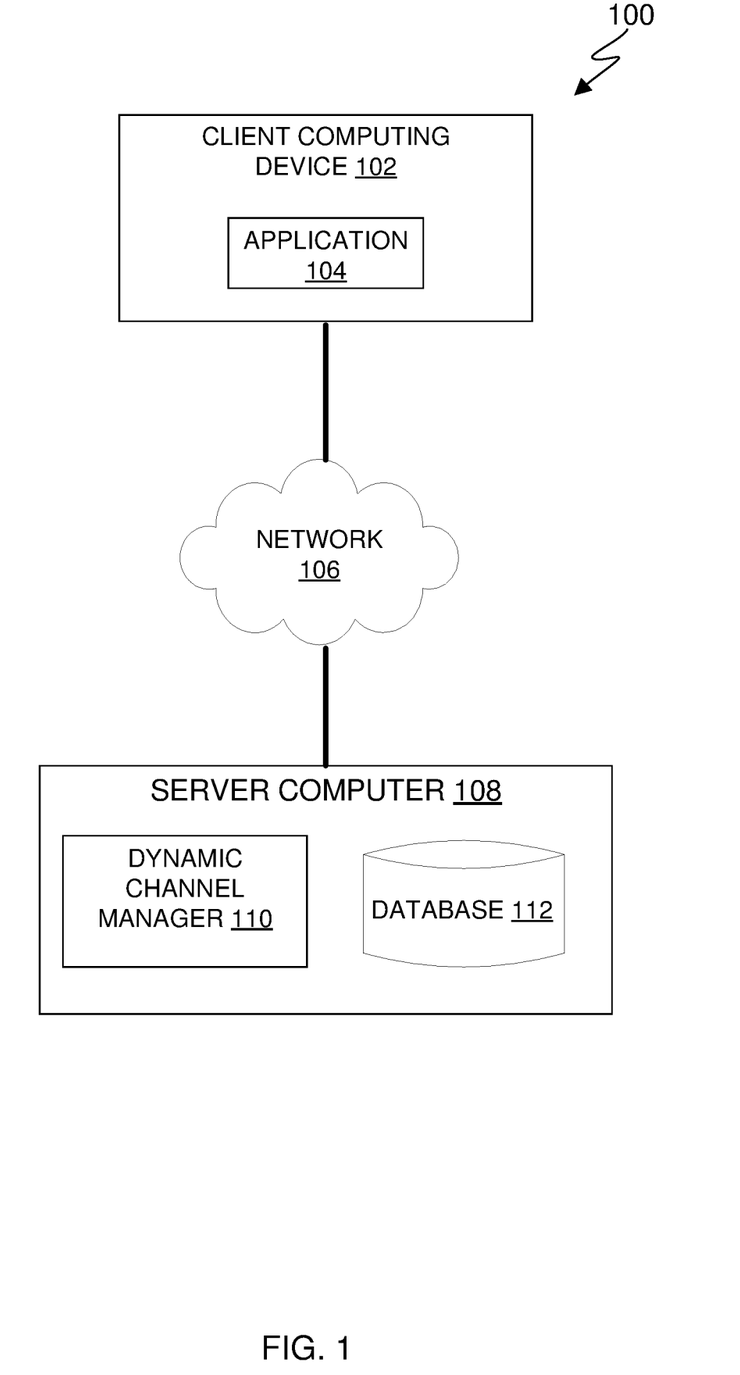
FIG. 1 depicts a block diagram of a computing environment, in accordance with an embodiment of the present invention.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computers as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 3.

In this embodiment, client computing device 102 is a user device associated with a user and includes application 104. Application 104 communicates with server computer 108 to access dynamic channel manager 110 (e.g., using TCP/IP) to access content, user information, and database information. Application 104 can further communicate with dynamic channel manager 110 to provision a dynamic channel allocation for mobile edge computing, as discussed in greater detail in FIG. 2.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts dynamic channel manager 110 and database 112. In this embodiment, dynamic channel manager 110 resides on server computer 108. In other embodiments, dynamic channel manager 110 can have an instance of the program (not shown) stored locally on client computer device 102. In other embodiments, dynamic channel manager 110 can be a standalone program or system that can provision a dynamic channel allocation for mobile edge computing. In general, dynamic channel manager 110 focuses on the end services of a service chain (mobile edge computing paradigm) where an edge can do the following: maintain raw time series stream, interpret raw time series stream to find central tendences, and marshal bot the stream to send it to the core.

Dynamic channel manager 110 provisions a dynamic channel allocation for mobile edge computing. For example, dynamic channel manager 110 can optimize and subsequently provision a channel by applying Lyapunov optimization on transmission stream framework to identify the channel while the system continues marshaling on the same channel or on different channel.

In this embodiment, dynamic channel manager 110 considers the following constraints:

Dynamic channel manager 110 establishes one original data queue system for each node, which has a mapping with one raw data queues and multiple interpreted data queue to measure the average delay. In this embodiment, dynamic channel manager 110 defines the effective channel transmission rate based on the original data queue according to the interpreted data queues, the raw data queue and the channel transmission rate.

To overcome the interaction of data marshalling and data transmission, dynamic channel manager 110 selects a transmission scheme based on Lyapunov optimization according to the original data queue. Dynamic channel manager 110 can consider mutual coupling induced by transmission scheduling. In this embodiment, dynamic channel manager 110 considers mutual coupling by evaluating the preference of marshalling according to the scheduling priorities of all nodes via machine learning and choose the optimal marshalling schemes at each node.

This drift-minimizing approach uses both current capacity states (Q,S) and current schedule understanding to stabilize the causation system and does not require a-priori knowledge of capacity rates or other interpretation probabilities. Dynamic channel manager 110 further matches the channel transmission rate as a part of the channel modeling so that the latency demands are matched for the chosen channel through the Lypanov Drift minimization construct.

Table 1, referenced below provides further clarification. In this scenario, frames, which are transferred at frequency of 30, at t=0, 15 packets are transferred at t=30, and the next lot of packets are transferred in which 10 are missing similarly for the next cycle in which missing count has been increased to 15. In this example, dynamic channel manager 110 analyzes and derives two possible reasons that cause the missing bits: a) channel congestion and code issues; b) unknown which is denoted by 'm'. In this example, dynamic channel manager 110 decides whether to continue with the existing channel or to switch at least some transmission to another channel. In this scenario, dynamic channel manager 110 uses Lyapunov optimization to identify the channel to which packets transmission is stable. Table 1 (pictured below) depicts both options that are evaluated, per Lyapunov optimization Q(t) is stable condition whereas Q*(t) is unstable condition. As shown in Table 1, Option 1 is selected as the effective channel.

TABLE 1

| frame: 30 | | | | t = 0 | t = 30 | t = 60 | Q(t) option 1 t = 90 | Q*(t) option 2 |
|---|---|---|---|---|---|---|---|---|
| | | A(t) | value 1 | 15 | 30 | 45 | 30 | 30 |
| | | | missing bits | | 10 | 15 | 15 | 15 |
| Q(t) | | | RCA | | 8 | 12 | 14 | 14 |
| α* | Channel 1 | | channel congestion | | 6 | 11 | 12 | 2 |
| α* | Channel 2 | | code issues | | 2 | 1 | 2 | 14 |
| | | | m | | 2 | 5 | 6 | 6 |

With the consideration of scheduling, embodiments of the present invention recognize that there are two main obstacles. In order to measure the average delay, dynamic channel manager 110 establishes one original data queue system for each node, which has a mapping with one raw data queues and multiple interpreted data queue. As mentioned above, based on the original data queue, dynamic channel manager 110 defines the effective channel transmission rate according to the interpreted data queues, the raw data queue and the channel transmission rate. To overcome the interaction of data marshalling and data transmission, dynamic channel manager 110 chooses a transmission scheme based on Lyapunov optimization according to the original data queue. Considering the mutual coupling induced by transmission scheduling, dynamic channel manager 110 evaluates the preference of marshalling according to the scheduling priorities of all nodes via machine learning and choose the optimal marshalling schemes at each node.

In this embodiment, Q(t) is the value of all the interpretations queue pertaining to the marshalling schedule. S(t) is the current capacity queue that is being evaluated. A(t) is the arrival rate of the stream of data stream for an interval. b(t) is the evaluation gradient of how much certainty we have towards identifying the interpretation with the marshalling schedule. α(t) is the decision to drive the cause of the capacity towards schedule and reduce the systemic error.

Dynamic channel manager 110 can use the following Equations (1-13) to perform the functions discussed above. For example:

$$Q_i(t+1) = \max[Q_i(t) - b_i(t), 0] + A_i(t) \; \forall i \in \{1, 2, \ldots m\} \; \forall t \in \{1, 2, \ldots\}$$ Equation (1)

where $Q_i(t)$ represents the value that is going to be passed in a given frame, $b_i(t)$ represents the expected value of the frame, and $A_i(t)$ represents the arrival rate.
Here, $$b_i(t) = \hat{b}_i(\alpha(t), S(t)) \triangleq \begin{cases} S_i(t) \text{ if, } RCA \text{ is for schedule } Q() \\ 0 \text{ for all otherwise causes identified} \end{cases}$$ Equation (2)

Using Equations 1 and 2, dynamic channel manager 110 can now create an expression that observes Q( ) for the capacity S( ) and then chooses α( ) to maximize π( ) as denoted by Equation 3, below.

$$\text{Maximize}[\pi(t)] :: E\{\Sigma_{i=1}^m Q_i(t), \hat{b}_t(\alpha(t), S(t)) | Q(t)\}$$ Equation (3)

where $\hat{b}_t(.)$, is the systemic function for expected value of the interpretation | marshalling schedule, m' is the value of the queue that remains to be interpreted in the given local system 'S'.

This conditional expression is with respect to the randomly observed capacity queue S(t) and the (possibly random) channel allocation decision α(t), giving rise to Equation 4 reproduced below.

$$\Sigma_{i=1}^m Q_i(t), \hat{b}_t(\alpha(t), S(t))$$ Equation (4)

Because this algorithm maximizes the weighted sum in Equation 4 over all alternative decisions, we derive Equation 5 below:

$$\Sigma_{i=1}^m Q_i(t), \hat{b}_t(\alpha(t), S(t)) \geq \Sigma_{i=1}^m Q_i(t), \hat{b}_t(\alpha^*(t), S(t))$$ Equation (5)

where, $\alpha^{\wedge*}$ (t) is the possible alternate decision to address the root cause for capacity utilization as some other interpretation.

Fixing a particular alternative (possibly randomized) decision $\alpha^{\wedge*}$ (t) for comparison and taking a conditional expectation of the above inequality (given Q(t)) gives, $$E\{\Sigma_{i=1}^m Q_i(t), \hat{b}_t(\alpha(t), S(t) | Q(t))\} \geq E\{\Sigma_{i=1}^m Q_i(t), \hat{b}_t(\alpha^*(t), S(t) | Q(t))\}$$ Equation (6)

Consider a Lyapunov function L( ) that can be operated over the Q( ) so that we get the scalar measurement of the evaluation for an interval.

We can consistently push the Lyapunov function towards a low error evaluation region, we first use Eq(1) to compute a bound on the change in the Lyapunov function for a small time change, as:

$$L(Q(t+1)) - L(Q(t)) = \tfrac{1}{2}[Q_i(t+1)^2 - Q_i(t)^2]$$ Equation (7)

Here,
(1) Q≥0,
(2) b≥0,
(3) A≥0,
(4) $(\max[Q-b, 0] + A)^2 \leq Q^2 + A^2 + b^2 + 2Q(A-b)$ Using Equation 4 and the above expressions, dynamic channel manager 110 can rearrange and solve for Equation 7, as, $$\Delta(Q(t)) \leq E\left\{\sum_{i=0}^m \frac{[A_i(t)^2 + b_i(t)^2]}{2} \bigg| Q(t)\right\} - E\left\{\sum_{i=0}^m Q_i(t)[b_i(t)] \bigg| Q(t)\right\} + \sum_{i=0}^m Q_i(t)\lambda_i$$ Equation (8)

where, we have defined Δ(Q(t)) as the conditional Lyapunov drift (i.e., how the system evolves from t to (t+1) for slot 't' as, $$\Delta(Q(t)) \triangleq E[L(Q(t+1)) - Q(t)) | Q(t)]$$ Equation (9)

Here, define "B" as a finite bound constant for all possible Q(t), and all possible data streams that can be taken, we get, $$E\left\{\sum_{i=0}^{m} \frac{[A_i(t)^2 + b_i(t)^2]}{2} \bigg| Q(t)\right\} \le B \qquad \text{Equation (10)}$$

Our derived finite bound B ensures that the expected average delay in the frame l channel allocation is under the expected and promised latency.

From Equation 10 and Equation 6 (hypothesis) dynamic channel manager 110 derives Equation 11, $$\Delta(Q(t) \le B - \{\Sigma_{i=0}^{m} Q_i(t) < E\{[b^*_i(t)] | Q(t)\} - \lambda_i >\} \qquad \text{Equation (11)}$$

where E is the expected value of $b^*_i(t)$ at a given Q(t) and $\lambda_i$ represents the arrival rate.

Because capacity queue is independent and identically distributed over time, the resulting $[b^*_i(t)]$ are independent of current queue utilization, and so $$E\{[b^*_i(t)] | Q(t)\} = E\{b^*_i(t)\} \ge \lambda_i + \varepsilon_{max}(\lambda) \qquad \text{Equation (12)}$$

where $\varepsilon_{max}(\lambda)$ represents the enforced error in arrival rate.

Using this in Equation 11, we get, $$\Delta(Q(t) \le B - \{\Sigma_{i=0}^{m} Q_i(t) \varepsilon_{max}(\lambda)\} \qquad \text{Equation (13)}$$

Here, it provisions strong stability whenever the arrival rate of the capacity is interior to localized rate of schedule (B). The advantage is that the drift-minimizing approach uses both current capacity states (Q,S) and current schedule understanding to stabilize the causation system, and it does not require a-priori knowledge of capacity rates or other interpretation probabilities.

Database 112 stores received information and can be representative of one or more databases that give permissioned access to dynamic channel manager 110 or publicly available databases. For example, database 112 can store received source material, depicted graphics, search parameters, audio, descriptions associated with the source material, interaction components, etc. In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment database 112 is stored on server computer 108.

Figure 2:
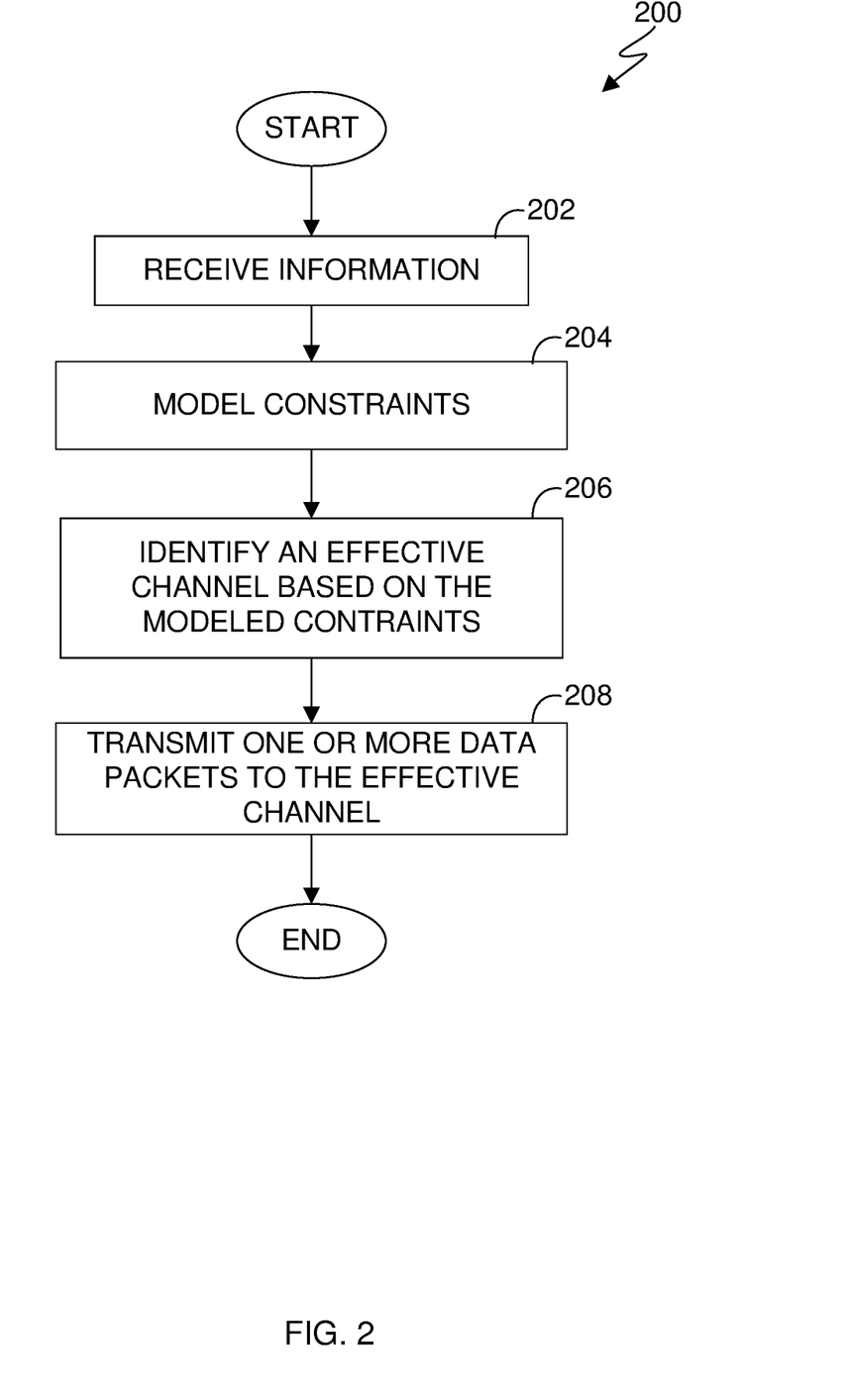
FIG. 2 is a flowchart depicting operational steps for provisioning a dynamic channel allocation for mobile edge computing, in accordance with an embodiment of the present invention.

FIG. 2 is a flowchart 200 depicting operational steps for provisioning a dynamic channel allocation for mobile edge computing, in accordance with an embodiment of the present invention.

In step 202, dynamic channel manager 110 receives information. In these embodiment, dynamic channel manager 110 receives information from the network. Information herein can be a mapping with one raw data queues and multiple interpreted data queues (e.g., value of all interpretations queues pertaining to a marshalling schedule). Information can further include scheduling priorities of all nodes connected to the network and an evaluation gradient of how much certainty, that is, confidence level a system has towards identifying the interpretation with the marshalling schedule. Other information received can include network information such as current capacity queues, arrival rates of streams of data for a given time interval, current transmission rates, load capacities, etc. In this embodiment, the received information can include a request from client computing device 102. In other embodiments, dynamic channel manager 110 can receive information from one or more other components of computing environment 100.

In step 204, dynamic channel manager 110 models constraints. In this embodiment, dynamic channel manager 110 models constraints using a combination of Equations 1 through 13 as previously discussed above.

In step 206, dynamic channel manager 110 identifies an effective channel based on the modeled constraints. In this embodiment, dynamic channel manager 110 identifies an effective channel based on the interpreted data queues, raw data queue, and the channel transmission rate. For example, dynamic channel manager 110 can identify an effective channel based on the stability of the channel. In this embodiment, the effective channel is defined as the stable channel, that is, the channel that has the lowest code issues and missing bits. In other embodiments, dynamic channel manager 110 can identify an effective channel according to any such user specifications and requirements that can consider channel congestion, code issues, data marshaling schemes, etc.

Dynamic channel manager 110 can further decide to transmit one or more data packets through a combination of channels based on joint data marshalling and transmission scheduling. For example, dynamic channel manager 110 can determine that the effective channel (i.e., stable) is channel 2 whereas the unstable channel is channel 1. Dynamic channel manager 110 can then determine whether to send all data packets through channel 1 or a portion at least some of the data packets for transmission through a combination of channel 1 and channel 2 using one or more machine learning models.

In step 208, dynamic channel manager 110 transmits one or more data packets to the effective channel. In this embodiment, dynamic channel manager 110 can transmit one or more data packets to the effective channel using network 106.

Figure 3:
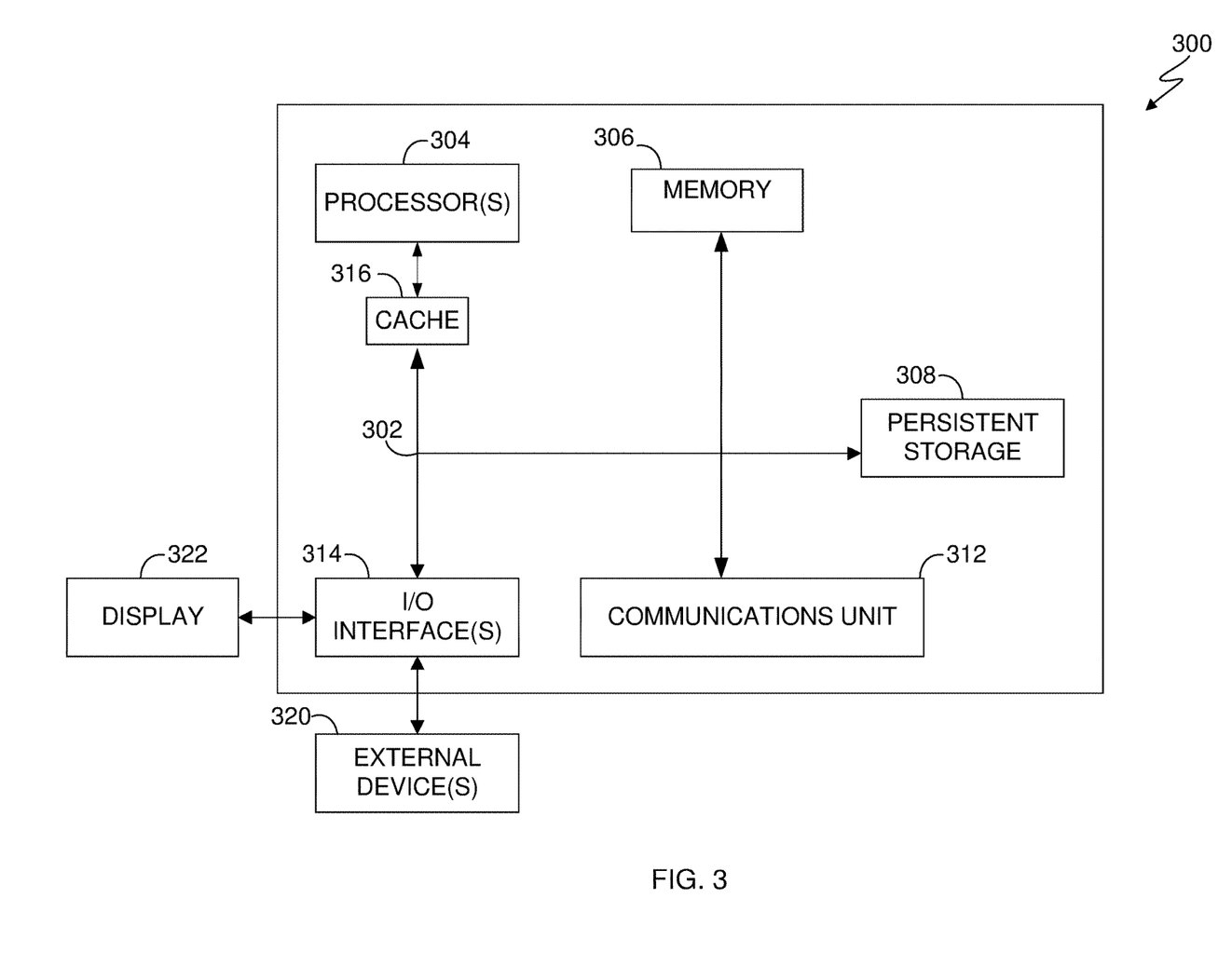
FIG. 3 is a block diagram of an example system, in accordance with an embodiment of the present invention.

FIG. 3 depicts a block diagram of components of computing systems within computing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 300 includes communications fabric 302, which provides communications between cache 316, memory 306, persistent storage 308, communications unit 312, and input/output (I/O) interface(s) 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Dynamic channel manager 110 (not shown) may be stored in persistent storage 308 and in memory 306 for execution by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 312, in these examples, provides for communications with other data processing systems or devices. In these examples, communications unit 312 includes one or more network interface cards. Communications unit 312 may provide communications through the use of either or both physical and wireless communications links. Dynamic channel manager 110 may be downloaded to persistent storage 508 through communications unit 312.

I/O interface(s) 314 allows for input and output of data with other devices that may be connected to client computing device and/or server computer. For example, I/O interface 314 may provide a connection to external devices 320 such as a keyboard, keypad, a touch screen, and/or some other suitable input device. External devices 320 can also include portable computer readable storage media such as, for example, thumb drives, portable optical or magnetic disks, and memory cards. Software and data used to practice embodiments of the present invention, e.g., dynamic channel manager 110, can be stored on such portable computer readable storage media and can be loaded onto persistent storage 308 via I/O interface(s) 314. I/O interface(s) 314 also connect to a display 322.

Display 322 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   identifying an effective channel on a transmission stream framework comprising a plurality of channels and nodes with respective capacity states and respective transmission schedules, comprising:
      performing a Lyapunov optimization on the transmission stream framework to provision channel stability responsive to an arrival rate of the respective capacity state is less than a localized rate of schedule, wherein the Lyapunov optimization is performed without a-priori knowledge of the respective capacity states; and
      determining whether to marshal to the effective channel based on transmission demands between the nodes and the effective channel providing a minimum latency between available options within the transmission stream framework.

2. The computer-implemented method of claim 1, wherein identifying an effective channel on a transmission stream framework using the respective capacity states and the respective transmission schedules comprises:
   measuring an average transmission delay by establishing a queue system for each node of the transmission stream framework.

3. The computer-implemented method of claim 2, further comprising:
   selecting a transmission scheme based on the Lyapunov optimization according to respective data queue system.

4. The computer-implemented method of claim 3, further comprising:
   evaluating preference of marshalling according to respective scheduling priorities of all nodes within the transmission stream framework via machine learning.

5. The computer-implemented method of claim 4, further comprising:
   selecting marshalling schemes at each node within the transmission stream framework.

6. The computer-implemented method of claim 1 further comprising:
   transmitting one or more data packets to the effective channel.

7. A computer program product comprising:
   one or more computer readable storage media; and
   program instructions stored on the one or more computer readable storage media to perform operations comprising:
      identifying an effective channel on a transmission stream framework comprising a plurality of channels and nodes with respective capacity states and transmission schedules, comprising:
         performing a Lyapunov optimization on the transmission stream framework to provision channel stability responsive to an arrival rate of the respective capacity state is less than a localized rate of schedule, wherein the Lyapunov optimization is performed without a-priori knowledge of the respective capacity states; and
         determining whether to marshal to the effective channel based on transmission demands between the nodes and the effective channel providing a minimum latency between available options within the transmission stream framework.

8. The computer program product of claim 7, wherein the identifying an effective channel on a transmission stream framework using the respective capacity states and the respective transmission schedules comprises:
   measuring an average transmission delay by establishing a data queue system for each node of the transmission stream framework.

9. The computer program product of claim 8, wherein the operations further comprise:
   selecting a transmission scheme based on the Lyapunov optimization according to respective data queue system.

10. The computer program product of claim 9, wherein the operations further comprise:
    evaluating preference of marshalling according to respective scheduling priorities of all nodes within the transmission stream framework via machine learning.

11. The computer program product of claim 10, wherein the operations further comprise:
    selecting marshalling schemes at each node within the transmission stream framework.

12. The computer program product of claim 7, wherein the operations further comprise:

transmitting one or more data packets to the effective channel.

13. A computer system comprising:

a processor set;

one or more computer readable storage media; and program instructions stored on the one or more computer readable storage media to cause the processor set to perform operations comprising:

identifying an effective channel on a transmission stream framework comprising a plurality of channels and nodes with respective capacity states and transmission schedules, comprising:

performing a Lyapunov optimization on the transmission stream framework to provision channel stability responsive to an arrival rate of the respective capacity state is less than a localized rate of schedule, wherein the Lyapunov optimization is performed without a-priori knowledge of the respective capacity states; and determining whether to marshal to the effective channel based on transmission demands between the nodes and the effective channel providing a minimum latency between available options within the transmission stream framework.

14. The computer system of claim 13, wherein the identifying an effective channel on a transmission stream framework using the respective capacity states and the respective transmission schedules comprises:

measuring an average transmission delay by establishing a data queue system for each node of the transmission stream framework.

15. The computer system of claim 14, wherein the operations further comprise:

selecting a transmission scheme based on the Lyapunov optimization according to respective data queue system.

16. The computer system of claim 15, wherein the operations further comprise:

evaluating preference of marshalling according to respective scheduling priorities of all nodes within the transmission stream framework via machine learning.

17. The computer system of claim 16, wherein the operations further comprise:

selecting marshalling schemes at each node within the transmission stream framework.

* * * * *